Feb. 21, 1933.  E. G. SULLIVAN  1,898,508
BATH APPARATUS
Filed Jan. 5, 1931
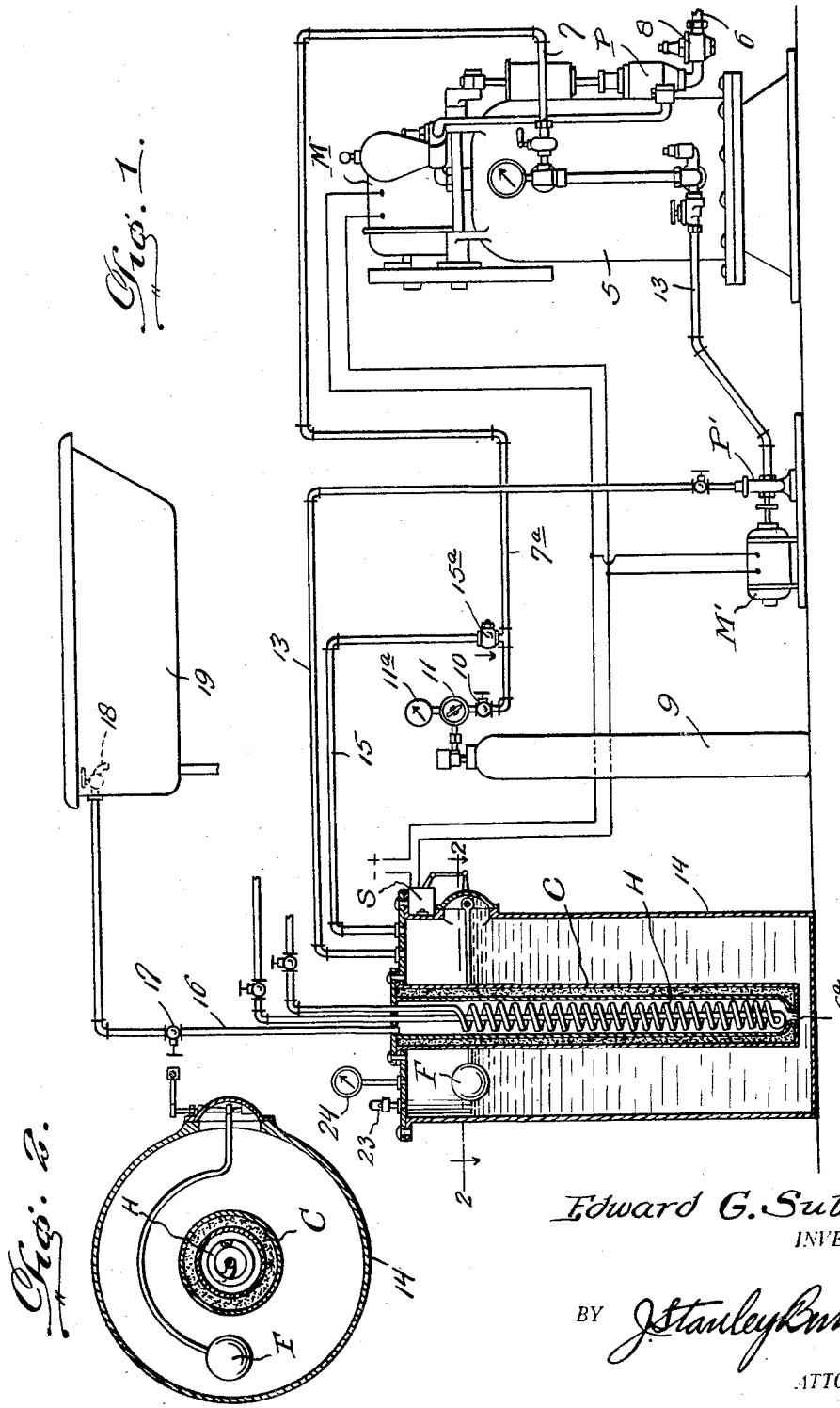
Edward G. Sullivan
INVENTOR.
BY J. Stanley Burch
ATTORNEY.

Patented Feb. 21, 1933

1,898,508

UNITED STATES PATENT OFFICE

EDWARD G. SULLIVAN, OF AMARILLO, TEXAS, ASSIGNOR TO JOSEPH S. BELT, OF AMARILLO, TEXAS

BATH APPARATUS

Application filed January 5, 1931. Serial No. 506,809.

The present invention relates to bath apparatus, and has more particular reference to an improved apparatus for supplying carbonated water to bath tubs or the like for bathing purposes.

The present invention has particular reference to improvements in the type of apparatus set forth in the pending application of Joseph S. Belt for patent upon bath apparatus, Ser. No. 493,211, filed November 3, 1930, which has matured into Patent No. 1,860,009.

The primary object of the present invention is to generally simplify and improve prior apparatus of the above kind, whereby the same may meet with all of the requirements for a successful commercial use.

The present invention consists in the novel form, combination and arrangement of parts hereinafter more fully described, shown in the accompanying drawing, and claimed.

In the drawing:

Figure 1 is a somewhat diagrammatic view, partly in elevation and partly in vertical section, of a bath apparatus embodying the present invention; and Figure 2 is a horizontal section on line 2—2 of Figure 1.

Referring in detail to the drawing, 5 indicates a conventional type of carbonator such as is commonly employed in apparatus for carbonating beverages, and which has an inlet pipe 6 for the water to be carbonated and an inlet pipe 7 for the gas by which such water is carbonated. The water supply pipe 6 is preferably provided with a regulator valve 8, and may be connected to a city water main as a source of water supply under pressure. Connected with the gas inlet pipe 7 by a supply line 7a is the outlet of an ordinary tank or flask 9 charged with liquid carbon dioxide under high pressure. The line 7a has a cut off valve 10, while a pressure regulator 11 and a pressure gage 11a are connected in the line 7a adjacent the flask 9. Leading from the carbonator 5 is an outlet pipe 13 for the carbonated water.

The carbonator 5 has the usual electric motor —M— operatively connected to a pump —P— by which water is forced under pressure into the tank of the carbonator. Arranged near the carbonator 5 is a storage tank 14 into the top of which the carbonated water outlet pipe 13 discharges. Interposed in the pipe 13 is a pump —P'— operated by the motor —M— through a suitable gearing or by a separate electric motor —M'—, as shown. The operation of the motors —M— and —M'— is controlled by a float switch —S— having its float —F— arranged in tank 14. When the float —F— lowers, the motor circuits will be closed to cause the pumps —P— and —P'— to operate, the pump —P— acting to force water into the tank of the carbonator for commingling with the incoming gas, and the pump —P'— forcing the carbonated water from the carbonator 5 into the storage tank 14. When the carbonated water in the tank 14 rises above a predetermined level therein, the float —F— operates the switch —S— to open the motor circuits, and to thereby throw the motors and pumps out of operation.

A pipe 15 provides communication between the top of the storage tank 14 and the gas line 7a, and arranged in this pipe is a check valve 15a which permits flow from the tank 14 to the gas line 7a but prevents flow in the reverse direction, for a purpose which will later become apparent.

The tank 14 is provided with an outlet pipe 16 which has a cut-off valve 17 and which extends into a heating chamber —C— arranged in the tank 14 and having a bottom inlet 16a adjacent the bottom of the tank 14. The outlet end of pipe 16 has a faucet 18 arranged to discharge into a bath tub 19 or the like. Means is provided for heating the carbonated water as it is discharged from the tank 14, such means being shown as embodying a heating coil —H— arranged in the chamber —C— and through which a heating medium, such as hot water or steam, may be circulated. A relief valve 23 and a pressure gage 24 are provided in the top of the tank 14 for obvious reasons.

It is impractical to so regulate the flow of gas from the flask 9 to the carbonator 5 so that all of the gas will be taken in solution with the water in the carbonator. Accordingly, some of the gas necessarily passes from the carbonator to the tank 14 along with the water and accumulates in the top of tank 14. After tank 14 is repeatedly filled with carbonated water, the pressure of the accumulated gas therein becomes equal to the pressure in the carbonator, and in the gas line 7a. When this occurs, the pressure in the carbonator will not force the carbonated water from the carbonator into the tank 14, and the pump —P'— is therefore required for this purpose. However, the pressure in tank 14 would ordinarily eventually rise beyond the power of pump —P'— and render the latter inoperative for this purpose. Accordingly, the pipe 15 is provided so that as the water rises in tank 14 the gas in the top of the latter is not compressed, but is displaced through the pipe 15 into the gas line 7a so as to pass back into the carbonator. In this way, the pressure in the tank 14 and in the carbonator 5 is equalized so that the pump —P'— may always operate to force the carbonated water into the tank 14. On the other hand, when the pressure in the carbonator 5 and gas line 7a exceed that in the top of tank 14 and in pipe 15, the check valve 15a will close so that the gas may not flow from flask 9 through pipe 15 into tank 14. As the level of the carbonated water in the tank 14 lowers, by reason of drawing the carbonated water off from the tank 14 through outlet pipe 16 and faucet 18, the float —F— of switch —S— lowers and closes said switch, thereby throwing the pumps —P— and —P'— into operation for carbonating more water and for forcing more carbonated water from the carbonator 5 into the tank 14. When the tank 14 again fills to the required level with carbonated water, the float —F— is raised so as to open the switch —S— and throw the motors —M— and —M'— out of operation. This renders the pumps —P— and —P'— inoperative so that no further water is carbonated and no further carbonated water is supplied from the carbonator to the tank 14 until the level of the carbonated water in said tank 14 is again lowered to a point where the switch —S— is again closed.

What I claim is:

1. In a bath apparatus, the combination of a carbonator having a carbonated water tank and means including a motor-operated pump to supply the same with water to be carbonated, said carbonator further having means including a gas supply line for supplying the same with gas by means of which the water is carbonated, a storage tank connected to said carbonator to receive carbonated water from the latter, a motor-operated pump for forcing the carbonated water from the carbonator to the storage tank, a by-pass connection providing communication between the top of the storage tank and the gas line, a check valve in said by-pass connection to prevent flow of gas therethrough from the gas line to the storage tank, and a float-operating switch for throwing said motor-operated pumps into and out of operation.

2. In a bath apparatus, the combination of a carbonator having a carbonated water tank and means including a motor-operated pump to supply the same with water to be carbonated, said carbonator further having means including a gas supply line for supplying the same with gas by means of which the water is carbonated, a storage tank connected to said carbonator to receive carbonated water from the latter, a motor-operated pump for forcing the carbonated water from the carbonator to the storage tank, a by-pass connection providing communication between the top of the storage tank and the gas line, a check valve in said by-pass connection to prevent flow of gas therethrough from the gas line to the storage tank, and a float-operating switch for throwing said motor-operated pumps into and out of operation, the float of said switch being arranged in the storage tank so as to respond to changes in the level of the carbonated water therein.

3. A bath apparatus comprising, in combination with a bath tub or the like having a water supply faucet, a conventional automatic carbonator having a carbonated water tank for receiving water as it is carbonated under pressure, means to supply said carbonator with water to be carbonated, means including a gas line for supplying said carbonator with gas by means of which the water is carbonated, a storage tank connected to said carbonator to receive carbonated water from the latter and store the same under pressure, a motor-operated pump for forcing the carbonated water from the carbonator into the storage tank, a by-pass connection providing communication between the top of the storage tank and the gas line, a check valve in the by-pass connection for preventing flow of gas through said connection from the gas line to the storage tank, a float-operated switch for throwing the motor of said pump into and out of operation, a heat insulated heating chamber arranged in said storage tank and having a bottom carbonated water inlet adjacent the bottom of said storage tank, a heating coil in said heating chamber, and a carbonated water outlet extending from the top of said heating chamber to said supply faucet of the bath tub or the like.

4. In a bath apparatus, the combination of a conventional carbonator having a tank to receive water as it is carbonated and provided with a source of gas supply and a motor-operated pump for forcing water under pressure into said tank so as to commingle with and be thoroughly carbonated by the gas as it enters said tank, a storage tank to receive the thoroughly carbonated water from the carbonator and to store the same under pressure, a motor-operated pump for merely forcing the thoroughly carbonated water from the carbonator into said storage tank, means to automatically throw said pumps into operation when the carbonated water in the storage tank lowers below a predetermined level and to automatically throw said pumps out of operation when it rises to such level, and a valve-controlled outlet for drawing the carbonated water from the bottom of the storage tank.

In testimony whereof I affix my signature.

EDWARD G. SULLIVAN.